United States Patent [19]
Campos-Loriz et al.

[11] Patent Number: 5,521,129
[45] Date of Patent: May 28, 1996

[54] SIALON-BONDED SILICON CARBIDE REFRACTORY

[75] Inventors: Diego Campos-Loriz, Niagara Falls, N.Y.; Martina Dierkes, Hilden, Germany; Gary Dukes, Winstanley, United Kingdom; James E. Funk, Jr., Templeton, Mass.; Michael A. Lamkin, Warrington, United Kingdom; Peter Schmitz, Neuss, Germany

[73] Assignee: The Carborundum Company, Niagara Falls, N.Y.

[21] Appl. No.: 305,619

[22] Filed: Sep. 14, 1994

[51] Int. Cl.$^6$ .................... C04B 35/565; C04B 35/599
[52] U.S. Cl. ................. 501/89; 501/92; 501/98; 264/60; 264/63; 264/65; 264/66; 264/86
[58] Field of Search ................. 501/92, 96, 97, 501/98, 89; 264/65, 56, 86, 60, 63, 66

[56] References Cited

U.S. PATENT DOCUMENTS

| | | |
|---|---|---|
| 3,890,250 | 6/1975 | Richerson . |
| 3,991,166 | 11/1976 | Jack et al. . |
| 4,243,621 | 1/1981 | Mori et al. . |
| 4,506,021 | 3/1985 | Jack et al. . |
| 4,557,884 | 12/1985 | Petrak et al. . |
| 4,578,363 | 3/1986 | Campos-Loriz . |
| 4,693,988 | 9/1987 | Boecker et al. . |
| 4,826,791 | 5/1989 | Mehrotra et al. . |
| 4,935,389 | 6/1990 | Umebayashi et al. . |
| 4,990,469 | 2/1991 | Dussaulx et al. ............. 501/92 |
| 5,221,647 | 6/1993 | Hida et al. ............. 501/98 |
| 5,296,386 | 3/1993 | Furuse et al. . |
| 5,302,329 | 4/1994 | Shiogai et al. . |

FOREIGN PATENT DOCUMENTS

| | | |
|---|---|---|
| 2805292 | 3/1982 | Germany . |
| 62-9548 | 2/1987 | Japan . |
| 62-10954 | 3/1987 | Japan . |
| 2131411 | 6/1984 | United Kingdom . |

OTHER PUBLICATIONS

Japanese Kokai J61097165 A (abstract only) (May 15, 1986).
Japanese Kokai J02006371 A (abstract only) (Jan. 10, 1990).
Japanese Kokai J03223166 A (abstract only) (Feb. 10, 1991).
K. H. Jack, Journal of Materials Science, "Review: Sialons and related nitrogen ceramics", vol. 11, pp. 1135–1158, (1976).
K. H. Jack, "Nitride Ceramics–The Systems", Oyez Scientific and Technical Services Ltd., London (1985).

*Primary Examiner*—Paul Marcantoni
*Attorney, Agent, or Firm*—Richard L. Hansen

[57] ABSTRACT

A predominantly β'-sialon-bonded silicon carbide refractory article is produced by reaction-nitriding a green body containing a plurality of silicon carbide powders, none having an average particle size greater than about 200 micrometers, a metal oxide oxygen source, fine grained silicon, and a source of aluminum. The invention also includes a raw batch and a process for producing the refractory article.

16 Claims, 1 Drawing Sheet

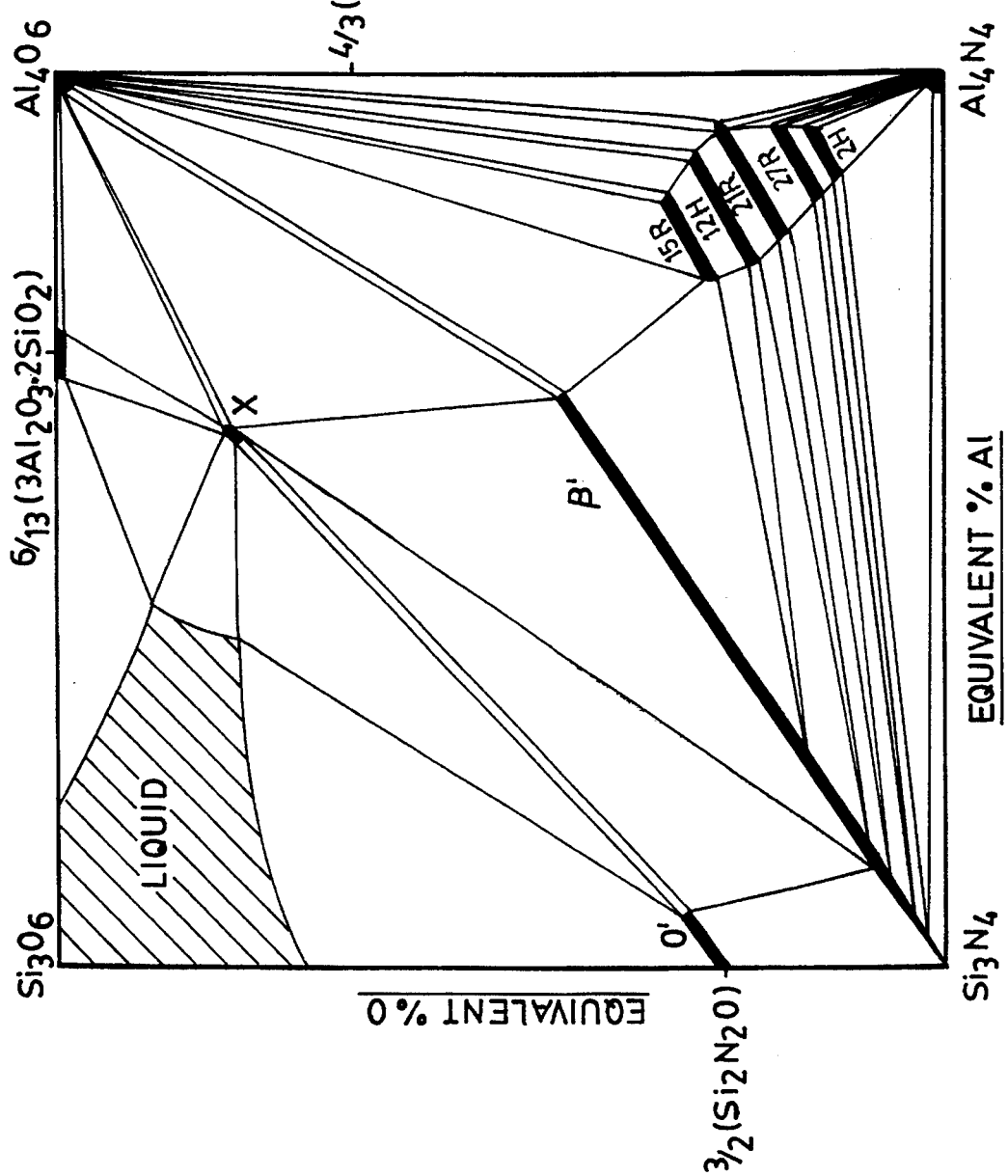

SIALON-BONDED SILICON CARBIDE REFRACTORY

This invention is in the field of refractory ceramic products, more particularly silicon carbide refractories, and especially silicon carbide refractories which are reaction-bonded with sialon.

BACKGROUND

Silicon carbide is well known for its high strength, thermal stability, abrasion resistance, and its ability to withstand oxidizing and otherwise corrosive environments. As a result, silicon carbide has been employed in numerous applications, ranging from the exotic to the mundane, in which these properties are important. Such applications include various advanced ceramics in which the silicon carbide is fabricated by hot pressing, reaction sintering or by pressureless sintering.

Silicon carbide is also employed in various refractory tiles, bricks, blocks or shapes which can be used as kiln furniture, crucibles for molten metal, as linings in steel making furnaces, etc. The markets for these latter articles cannot support the cost and do not require the performance of fine-grained, pure silicon carbide. In these cases, the desired silicon carbide-containing articles can be produced by suspending particulate silicon carbide in a dissimilar bonding matrix.

In making such articles, silicon carbide powder can be combined with the bonding matrix per se, or the silicon carbide powder can be combined with chemical precursors and the bonding matrix generated in situ. Silicon carbide products produced by the latter process are referred to as "reaction-bonded silicon carbide" herein, and it is to this type of refractory product that this application is directed.

Reaction-bonded silicon carbide in which the bond phase is silicon nitride is well known. For example, U.S. Pat. No. 4,990,469 describes such materials and a process for preparing them from a mixture of silicon carbide particles, silicon, and a small amount of inorganic oxide. A green body fired under nitrogen at 1420° C. exhibited density, porosity and bending strength of 2.83 g/cm³, 11% and about 27 Kpsi, respectively.

Silicon nitride-bonded silicon carbide refractories invariably contain a small amount of oxygen which is carried on the surfaces of the reactant powders and is present as silica in the refractory product. The free silica has a detrimental effect on high temperature properties, particularly the alkali resistance of silicon nitride-bonded silicon carbide.

This problems is addressed according to the instant invention by utilizing a sialon bond phase, e.g., $\beta'$-sialon, for the fine-grained silicon carbide refractory. Sialons are compounds of silicon, aluminum, oxygen, and nitrogen which can be envisioned as derived from silicon nitride through the simultaneous substitution of silicon by aluminum and nitrogen by oxygen. This leads, in the case of $\beta'$-sialon, to a solid solution which can range in composition as expressed by the formula:

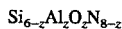

where $0<z<\sim 4.2$. The case in which $z=0$ represents pure silicon nitride. Sialon formation provides a sink for the troublesome free silica mentioned above, the oxygen being incorporated into the sialon lattice.

FIG. 1 shows the Si—Al—O—N behavior diagram; the x and y axes extend from 0 to 100 equivalent %. The stable phases are indicated by the solid darkened areas. FIG. 1 shows a $\beta'$-sialon solid solution range as the solid area extending from the $Si_3N_4$ corner at the lower left toward the center of the diagram. There is also an O'-sialon solid solution range indicated near the y-axis. O'-sialons derive from silicon oxynitride, $Si_2N_2O$, very much as $\beta'$-sialons derive from $\beta$-silicon nitride, $Si_3N_4$, i.e., through partial substitution of Al and O atoms for Si and N atoms, respectively. Although the $\beta'$-sialon range of compositions is very small, the O'-sialon range is even smaller. According to FIG. 1, the highest substitution occurs at about 7 equivalent % Al, represented by the atomic formula:

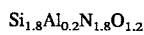

$\beta'$-Sialons, derived from $\beta$-silicon nitride, have physical and mechanical properties similar to those of silicon nitride. Their chemical properties are intermediate between those of silicon nitride and alumina and seem to depend to some extent on the value of the z parameter (also called "substitution number"). Chemical characteristics of $\beta'$-sialons, such as resistance to corrosion, are believed to approach those of alumina as the z value increases. In addition, the fact the sialons are solid solutions leads to their lower vapor pressure and decreased tendency to decomposition at high temperatures relative to pure silicon nitride. For these reasons, sialon may be preferred over silicon nitride as a bond phase for silicon carbide refractories in those applications where resistance to certain corrosive environments and thermodynamic stability at high temperatures are of primary importance. Sialon bonding offers the potential for, among other things, improved alkali resistance, creep resistance, and resistance to molten metals as compared to silicon nitride. In addition, if the substitution number z is not too large, the oxidation resistance of the sialon-bonded silicon carbide will remain very good.

A reaction-bonded silicon carbide refractory having a $Si_3N_4$ bond phase modified by the addition of sialon formers is described in U.S. Pat. No. 4,578,363. Reaction-bonded silicon carbide was produced by firing a green compact containing a mixture of silicon carbide powders, as well as silicon and aluminum powders, under nitrogen at 1420° C. The only oxygen introduced was the thin layer of silica believed to be present on the silicon and SiC powders. The majority of the bond phase in the resultant product was nonetheless $\beta'$-sialon. The density, porosity and bending strength of the article were about 2.6 g/cm³, 14% and about 5 Kpsi, respectively. The resistance of the product to attack by molten alkali was shown to be superior to that of a $Si_3N_4$-bonded silicon carbide article, but the resistance to steam oxidation was not improved. The relatively large particle sizes of some of the components precluded the use of the slip casting process to make the reaction-bonded products.

Sintered refractories composed of $\beta'$-sialon, either added per se or produced in situ, are described in U.S. Pat. No. 4,243,621. It is disclosed that a green body containing $\beta'$-sialon precursors can also include an aggregate of medium to coarse-grained (i.e., $\leq 250$ micrometer) alumina, silicon nitride, silicon carbide, $\beta'$-sialon, zirconia, or zircon. For example, when SiC was employed as an aggregate constituting about 65 wt % of the product, the fired refractory resulting from a pressed compact exhibited a density of about 2.6 g/cm³, 19% porosity, and a bending strength of about 5 Kpsi. After refiring the product under nitrogen, these numbers became 2.7 g/cm³, 10% and 5.4 Kpsi, respectively.

U.S. Pat. No. 4,506,021 describes O'-sialon ceramic products, and Jack, K. H., J. Mater. Sci., 11, 1135 (1976), is a review of sialons and related nitrogen ceramics.

SUMMARY OF THE INVENTION

Whereas moving from a silicon nitride bond phase to a predominantly sialon bond phase in reaction-bonded silicon carbide refractories has yielded improvements in certain important properties of the refractory, such as alkali resistance, the bending strength is less than desirable for some applications, and it would often be more convenient to produce the green body by slip casting, rather than via a die-pressed green compact.

It has now been found these deficiencies in the prior art can be largely overcome in a reaction-bonded ceramic article comprising an aggregate phase of fine silicon carbide powders and a bond phase which is predominantly β'-sialon; the term "predominantly" in this context means greater than about 50 percent by weight ("wt %" hereinafter). Other aspects of the invention include a raw batch from which the ceramic article is produced, including a raw batch which is suitable for slip casting or pressure casting, and a process for making the ceramic body via the raw batch.

The invention will be more readily understood by reference to the drawing which accompanies this specification and to the detailed description which follows.

BRIEF DESCRIPTION OF THE DRAWING

FIG. 1 is a behavior diagram for the Si—Al—O—N system at 1700° C. and is taken from Jack, K. H., "Nitride Ceramics—The Systems", Proceedings of the First European Symposium on Engineering Ceramics, Oyez Scientific and Technical Services Ltd., London (1985).

DETAILED DESCRIPTION

The β'-sialon-bonded silicon carbide of this invention is produced from a raw batch. The raw batch can be adapted for the production of a green ceramic compact, e.g., by adding a temporary binder and a lubricant, a technique well known to those skilled in the art. Alternatively and preferably, the raw batch can be adapted for slip casting by adding a vehicle comprising water and other optional components. In the following description, components and the composition ranges thereof are generally referred to a raw batch adapted for slip casting, but it will be evident to those skilled in the art that the aqueous vehicle employed in slip casting can be replaced by, for example, a temporary binder and the stated composition ranges readily adjusted for the difference in the amount of vehicle required.

In general, for all powder reactants it is desirable that the particle size be as small as possible to facilitate complete reaction in a convenient timespan at a convenient firing temperature, and also for efficient deflocculation of a slip, if the raw batch is a slip. However, it is possible for the powders to be so fine as to be disadvantageous. This can occur because the high surface area of very fine materials requires an increased amount of water to wet the powder. Powder selection is, therefore, a compromise.

In any case, the raw batch contains silicon carbide as the aggregate phase. Silicon carbide is commercially available in the form of powders of various average, maximum or minimum particle sizes. In order to ensure the desired properties in the refractory articles of this invention, a plurality of SiC powders of different particle sizes are utilized in the aggregate phase. The powders are selected for adequate packing, the adequacy of different grain size distributions being selected through computer modeling and experimental testing of their packing behavior.

At least two, and sometimes three or four powders of different average particle size can be employed, but if the raw batch is adapted for slip casting, no powder should have a particle size greater than about 200 micrometers, preferably no greater than about 150 micrometers. The amount of silicon carbide in the raw batch adapted for slip casting should be greater than about 50 wt %, although it is important to realize that if the silicon carbide content is greater than about 90 wt % the bond phase content will generally be less than the amount desirable for a well-bonded product.

Since β'-sialon is a three component system, the production of any composition within the β'-sialon range (except the $Si_3N_4$ limit, for which z is 0) requires the use of at least three chemical species in the starting raw batch. It is most practical to select nitrogen as one of these three components and to provide nitrogen in the firing process by appropriate selection of the furnace atmosphere, termed a "nitrogenous atmosphere" herein, e.g., $N_2$, an $N_2/H_2$ gas mixture, $NH_3$, or a mixture of these gases along with suitable inert gases, such as argon or helium.

The remaining components of the raw batch must therefore provide silicon, aluminum and oxygen in amounts suitable for the production of the sialon phase. The quantities and types of components selected are determined by the desired value of the substitution number z, the total amount of bond phase desired, and which of the various possible routes is to be used to produce the sialon. Such routes include as raw materials, e.g., Si, Al and $SiO_2$; Si, Al, $Al_2O_3$, and $SiO_2$; Si and $Al_2O_3$; or Si, Al, and $Al_2O_3$.

One practical choice is a combination of Si metal, Al metal, and one or more of their oxides. Although it is also possible to produce a sialon bond phase from the nitrides and oxynitrides of these elements, i.e., $Si_3N_4$, AlN, and $Si_2N_2O$, it is preferred to avoid these as raw materials for this invention, since their use would require a relatively high firing temperature, about 1700 ° C., in order to fully react the starting materials through a solid-liquid sintering mechanism. The use of the metals and their oxides has the advantage of attaining sialon bond formation at lower temperatures, i.e., 1400°–1500° C., through a mechanism involving reaction with the nitrogen-containing gas phase.

Therefore, a source of silicon is another component of the raw batch. The silicon can be derived from the powdered metal, and it is preferred to do so for the practical reasons set forth above and also because of its relatively low cost, high purity and ready availability. Thus, silicon metal should comprise between about 8 wt % and about 25 wt % of the raw batch adapted for slip casting, preferably between about 8 wt % and about 18 wt %. The silicon metal should preferably be in the form of a fine powder having a particle size no larger than about 75 micrometers. A blend of two or more powders of different particle sizes; e.g., one powder of particle size less than about 75 micrometers, and a second powder of, e.g., less than about 6 micrometers particle size is advantageously employed.

In addition, the raw batch contains a source of aluminum in the form of the metal or compounds of aluminum. Suitable compounds include, for example, aluminum nitride, alumina, aluminum hydroxide, and aluminum salts, such as aluminum chloride, sulfate, phosphate, borate, etc. Among these possibilities, aluminum metal and/or alumina are preferred, and reactive alumina is especially desirable. Reactive alumina is primarily the alpha polymorph and has a relatively high surface area, i.e., greater than about 2 $m^2/g$. The aluminum metal or alumina should be a fine powder. The powder should preferably have a particle size no larger than about 75 micrometers if the metal is employed, less than about 10 micrometers if alumina is used. The aluminum in the raw batch adapted for slip casting, present as the metal or as the aluminum content of an aluminum-containing compound, should preferably lie in the range of about 1.5 wt % to about 5.5 wt %.

The raw batch also contains a source of oxygen, preferably in the form of one or more metal oxides or oxynitrides of the metals which occur in sialon, i.e, silicon and/or aluminum. Both alumina and silica are readily available in high purity at reasonable cost. In addition, the oxygen and aluminum sources can be combined in alumina, and, if sufficient alumina is employed, the alumina can function as both oxygen and aluminum source, and it is preferred to do so. If sufficient alumina is employed that neither another metal oxide nor aluminum metal are required, the resultant bond phase contains, not only predominantly β'-sialon, but also a significant amount, i.e., generally at least about 20 wt % of the bond phase, silicon oxynitride, $Si_2N_2O$, or a composition in the O'-sialon range which derives from silicon oxynitride, combined.

If silica is utilized as the sole oxygen source in conjunction with a non-oxidized aluminum source, i.e., aluminum metal, the silica content should be in the range of about 1.5 wt % to about 5 wt %, preferably between about 2 wt % and about 3 wt %. The resulting bond phase will then consist predominantly of β'-sialon.

The particle size of the silica is important, since particles which are too large will react sluggishly, but particles which are too fine, or have a surface area which is high, such as found in fumed silica, will absorb large quantities of water and decrease the availability of water as a vehicle, seriously affecting the rheology of the raw batch. This is especially deleterious if the raw batch is adapted for slip casting. Preferably, the surface area of the silica should lie in the range between about 4 and about 6 $m^2/g$, and the particle size should be less than about 10 micrometers. In addition, it is preferred that the silica be amorphous, since amorphous silica is generally more reactive.

If the only aluminum source is the oxide, $Al_2O_3$, the β'-sialon bond phase forms during the firing under a nitrogen-containing gas from the three components: $Si_3N_4$ derived from nitridation of the metallic silicon, $Al_2O_3$ introduced as such in the raw batch, and silica which is introduced as an oxide film on the surface of the Si and SiC grains. In this case, according to the Si—Al—O—N phase diagram of FIG. 1, a β'-sialon phase and a silicon oxynitride, $Si_2N_2O$ phase, which is shown as area O' on the left in FIG. 1, would be expected to form simultaneously. Thus, to minimize formation of silicon oxynitride, it is preferred that aluminum oxide be the sole added source of oxygen (other than the oxygen unavoidably introduced as a surface film on the Si and SiC), since extra oxygen added as silica would, according to FIG. 1, drive the bond composition toward the $SiO_2$ corner and away from the small β'-sialon area.

For the aforesaid reason, if alumina is the only aluminum source, it is preferred that no silica be added as such, and the alumina content of the raw batch adapted for slip casting should preferably be in the range between about 3.5 wt % and about 5.5 wt %, especially about 5 wt %. If, on the other hand, both alumina and another oxygen source, such as silica, are utilized, the total aluminum present in the raw batch adapted for slip casting as both the metal and the metal in the oxide should lie in the range between about 3.5 wt % and about 5.5 wt %.

It may be desirable in some instances to introduce certain optional ingredients as well. Such components include, for example, one or more nitridation catalysts, such as metal fluorides, iron or iron compounds, such as the oxides. When utilized, such ingredients will generally constitute no more than about 1 wt % of the raw batch.

Lastly, the raw batch contains a vehicle, which includes various processing aids, some of which are employed in very small amounts. The nature of the vehicle will depend upon whether it is desired to make the green ceramic body by a slip casting or pressure casting route or a semi-dry route via a pressed compact. Depending upon which route is selected, the nature of the vehicle and the amount of vehicle in the raw batch will differ. In any case, the vehicle will comprise between about 2 wt % and about 17 wt % of the raw batch. The higher end of this range, i.e., between about 12 wt % and about 17 wt %, is applicable if the vehicle is aqueous, and the raw batch is adapted for slip casting. The lower end of the range, i.e., between about 2 wt % and about 12 wt %, is used if the semi-dry route is selected.

If the preferred slip casting route is selected, the vehicle may optionally include, in addition to water, one or more dispersants, defoamers, and deflocculants. Examples of suitable dispersants or surfactants include Triton X-100 and Triton CF-10, both of which are available from Union Carbide Corp. Suitable defoamers include DB-31 and DC-1430 which can be obtained from Ashland Chemical Co. Examples of suitable deflocculants include Dispex N40 available from Allied Colloids, KV5080 sold by Zimmer & Schwarz, as well as sodium silicates, sodium hydroxide and ammonium hydroxide solutions.

The raw batch, including the vehicle, is processed into a green body. The components of the raw batch are thoroughly mixed to ensure homogeneity. The final stage of mixing a raw batch adapted for slip casting is preferably conducted in a ball mill using silicon carbide media. Optimum performance of the slip is achieved by maintaining as low a water content (as high a solids content) as possible, but also by minimizing the viscosity using means other than increased water content. Higher than optimum water content generally leads to lower than optimum density in the fired article. The viscosity can be minimized by maintaining the pH in the range of about 6.5 to 8.5, and about 600 to 800 cps is optimum. In order to maintain the pH in this range it will usually be necessary to add base, e.g., sodium hydroxide, sodium silicate or ammonia. If necessary, the pH can be lowered by adding acid, e.g., hydrochloric acid. It is generally preferred to avoid high pH, because the alkali will react with metallic components in the slip, producing gas, which increases the porosity and decreases the strength of the fired article. The viscosity of the slip tends to be higher at either end of the pH scale.

The mixed raw batch adapted for slip casting is then simply cast into a porous plaster mold using the technique well known to those skilled in the art, or into a porous plastic mold if pressure casting is to be used. A relatively slow casting rate, i.e., the rate at which the solid wall of the green article is built up, is preferred; this tends to increase the density of the fired article. One way of controlling the casting rate is through the appropriate selection of the porous mold.

Preferably, the casting molds used for slip casting in this invention are made from a combination of gypsum plasters available from, for example, U.S. Gypsum Co. The combination to be utilized for a particular application can be determined readily by experimentation. Slip casting is a technique well known to those skilled in the ceramics art.

After recovering the green body from the mold, it is allowed to dry. The green body is then ready to be fired. Firing is accomplished in a non-oxidizing, nitrogenous atmosphere at one or more temperatures in the range of about 1300° C. to about 1600° C. The firing may be done in a retort made of refractory material which is introduced into a periodic gas-fired kiln. The nitrogenous atmosphere can consist of $N_2$ gas, mixtures of $N_2$ with an inert gas, such as argon or helium, $N_2/H_2$ mixtures, or ammonia, for example. Nitrogen demand systems may be used, if necessary, to ensure full nitridation without risk of elevating the temperatures above the melting point of Si (1410° C.) because of the exothermic nitridation reaction. Alternatively, firing may be conducted in a tunnel kiln if care is taken to maintain the nitrogenous atmosphere throughout the cycle.

The nitriding temperature should be in excess of 1300° C. to achieve a commercially practical rate of reaction. The temperature should not exceed about 1600° C. to avoid decomposition of the bond phase being formed. The choice of firing temperature is a compromise between the higher rates of reaction associated with higher firing temperatures and the lower costs associated with lower firing temperatures. The range of about 1420° C. to about 1450° C. is generally preferred, since temperatures within this range give reasonable rates of reaction in a convenient time at an acceptable cost. At a temperature of about 1420° C., nitriding is generally accomplished in about 4 to 6 hours, although a longer period, e.g., about 12 hours, is recommended to assure complete reaction and annealing of the article being produced. After nitriding is complete, the article is allowed to cool naturally under a non-oxidizing atmosphere. The β'-sialon-bonded silicon carbide refractory article can then be recovered.

The bond phase comprises no more than about 40 wt % of the refractory article and includes at least about 50 wt % β'-sialon, between about 5 wt % and about 30 wt % silicon nitride, and up to about 40 wt % silicon oxynitride and/or O'-sialon.

Although not required, in some cases it may prove advantageous to refire the refractory, since this can improve some of the properties, such as increasing the oxidation resistance and/or the bending strength. For example, the article may be refired at about 1400° C. in air. A typical refiring cycle is 12 hrs at 1400° C.

The invention will be clarified by reference to the following Examples. In the Examples, bulk density and apparent porosity are measured by the immersion method in boiling water, i.e., according to ASTM C 20-80, or, in some cases, by immersing under vacuum according to BS 1902: Section 3.8: 1989 (ISO 5017:1988). Flexural or bending strength is determined by 4-point bending of sample bars 0.25 in. wide and 0.125 in. thick machined from fired specimens, with outer and inner spans of 1.5 in. and 0.75 in., respectively, according to ASTM C 1161- 90. Oxidation resistance is measured by steam oxidation according to ASTM C 863-77. The chemical and phase compositions of the various components of the reaction-bonded refractory articles of this invention are determined by chemical and X-ray diffraction analysis.

EXAMPLE 1

An aqueous slurry of aluminum and ferric oxide is prepared by dispersing 47 g coated aluminum powder (Alcoa −200 mesh U.S. Standard Sieve, coated with isostearic acid) and 11 g ferric oxide powder in 100 ml deionized water to which a few drops of Union Carbide Triton CF-10 surfactant has been added. The resultant slurry is added with stirring to 280 ml deionized water, and the following additional ingredients are also added while the slurry is stirred continuously: 1822 g silicon carbide powder consisting of 783 g Sika F100 SiC (maximum particle size 150 μm), 310 g Sika F180 SiC (maximum particle size 85 μm), and 729 g Nissarundum GMF-6S SiC (maximum particle size 1.6 μm); 53 g amorphous fused silica (Johnson Matthey, less than 400 mesh U.S. Standard Sieve); and 222 g silicon metal powder consisting of 111 g Elkem Si powder (less than 600 mesh U.S. Standard Sieve) and 111 g Elkem Si powder (45 μm).

It is important that the pH of the slip which results be adjusted to between 8.0 and 8.5 with ammonium hydroxide solution, and the raw batch, whose content is summarized in Table I, is mixed with a mechanical stirrer for 1 hr. After so mixing, the raw batch slip is placed in a ball mill with 500 g of 0.5 in. SiC ball grinding media and milled for 48 hrs. The milled slip is cast into porous plaster molds. The green bodies are recovered from the molds and dried.

The dried green bodies are fired at 1450° C. under nitrogen. The temperature is raised from room temperature to 1200° C. at a constant rate over 14 hrs. The temperature is then raised at a constant rate from 1200° C. to 1450° C. over 12 hrs, and the temperature is maintained at 1450° C. for 6 hrs, after which time the furnace is allowed to cool naturally under nitrogen to room temperature.

The fired refractory articles are recovered. They exhibit a density of 2.67 g/cm$^3$, apparent porosity of 14 percent by volume ("vol %" hereinafter), and flexural strength of 23 Kpsi at room temperature. Weight and volume change under steam oxidation (200 hr. at 1100° C.) are 4.9 wt % and 0.6 vol %, respectively. The refractory articles comprise 78 wt % SiC, the balance being bond phase comprising about 80 wt % β'-sialon, the balance of the bond phase being α-Si$_3$N$_4$.

The aforesaid refractory articles are refired in air at 1400° C.; the temperature is raised at a constant rate from room temperature to 1400° C. over 24 hrs., held at 1400° C. for 10 hrs, cooled at a constant rate from 1400° C. to 600° C. over 12 hrs., and then allowed to cool naturally to room temperature. The refired refractory articles exhibit the properties shown in Table II.

EXAMPLE 2

A total of 65.0 parts silicon carbide by weight, i.e., 41 parts silicon carbide (<159 micrometer particle size, ESK grade 100/f) and 37 parts silicon carbide (<1.6 micrometer particle size, Nissarundum, grade GMF 6S) is mixed with water (a total of 15.5 parts by weight) in a paddle mixer for 2 hrs. The pH of the mixture is then adjusted to about 7 by adding 1M NaOH. To the neutralized mixture are then gradually added the following with stirring: 21 parts by weight silicon, i.e., 10.5 parts of <75 micrometers particle size (from Elkem) and 10.5 parts of less than 6 micrometers particle size (from Elkem); 5 parts by weight alumina (BACO grade RA7 reactive alumina, primarily the alpha polymorph, having a surface area of 2.5 to 3.5 m$^2$/g); and 0.5 parts by weight ferric oxide (Bayer 98%). The pH is then again adjusted to about 7, and the mixture is transferred to a ball mill containing SiC media where it is milled for 48 hrs.

The mixture is removed from the ball mill, and the pH is again adjusted to produce a slip having a viscosity between 600 and 800 cps (Brookfield spindle #3 at 50 rpm). The content of this raw batch is summarized in Table I. The mixture is then cast into a plaster mold. After draining, the green body is separated from the mold, dried and fired under nitrogen. The properties of the fired product are set forth in Table II. Refiring the fired refractory product in air at about 1400° C. reduced the apparent porosity of the reaction-bonded silicon carbide article from 12 vol % to <1 vol % as measured by the vacuum immersion test of BS 1902: Section 3.8: 1989 (ISO 5017:1988).

EXAMPLE 3

Silicon carbide, i.e., 79.5 parts by weight consisting of 41.5 parts having a particle size of <150 micrometers (ESK grade 100/f) and 38 parts having a particle size of <1.6 micrometers (Nissarundum grade GMF 6S) is stirred with water (17 parts by weight total) in a paddle mixer for 2 hrs. After adjusting the pH of the mixture to about 8 with 1M NaOH, the following are gradually added with stirring: silicon, a total of 12.7 parts by weight, consisting of 6.3 parts <75 micrometers particle size (Elkem) and 6.4 parts <6 micrometers particle size (Elkem); 3.2 parts by weight silica (Elkem grade 871D); 2.6 parts by weight aluminum (Alcoa grade 1641L); 2.6 parts by weight alumina (BACO grade RA7 reactive, primarily alpha polymorph, surface area 2.5 to 3.5 m$^2$/g); and 0.5 parts by weight ferric oxide (Bayer 98%).

After adjusting the water content and the pH to about 8, the mixture is transferred to a ball mill containing SiC media and milled for a total of 48 hrs. After again measuring and adjusting the pH to about 8 and adding water to adjust the viscosity of the mixture to between 600 and 800 cps (Brookfield spindle #3 at 50 rpm), the raw batch, whose composition is summarized in Table I, is cast into a porous mold. After draining, recovering the green body from the mold, and drying, the green body is fired under nitrogen. The content of the bond phase and the properties of the fired article are summarized in Table II. After refiring the article in the manner outlined in Example 2, the apparent porosity was reduced from 13 vol % to 5 vol %.

TABLE I

RAW BATCH COMPOSITIONS

| | (Wt %) | | |
|---|---|---|---|
| Component | Ex. 1 | Ex. 2 | Ex. 3 |
| Silicon Carbide | 71.8 | 63.8 | 65.4 |
| Silicon | 8.8 | 18.1 | 10.9 |
| Aluminum | 1.9 | | 2.2 |
| Alumina | | 4.3 | 4.3 |
| Silica | 2.1 | | 2.7 |
| Ferric oxide | 0.4 | 0.4 | 0.4 |
| Vehicle (H$_2$O etc.) | 15.0 | 13.4 | 14.1 |
| | 100.0 | 100.0 | 100.0 |

TABLE II

PROPERTIES OF FIRED ARTICLES

| Property | Ex. 1 | Ex. 2 | Ex. 3 |
|---|---|---|---|
| Bond phase (wt %) | 21 | 34 | 30 |
| α-Si$_3$N$_4$ | ≈20 | ≈10 | ≈20 |
| β'-sialon | ≈80 (z ≈ 1) | ≈60 (z ≈ 1) | ≈80 |
| Si$_2$N$_2$O[a] | | ≈30 | |
| density (g/cm$^3$) | 2.72 | 2.80 | 2.70 |
| porosity (vol %)[b] | 5 | 0.1 | 5 |

TABLE II-continued

PROPERTIES OF FIRED ARTICLES

| Property | Ex. 1 | Ex. 2 | Ex. 3 |
|---|---|---|---|
| Bending Str. (Kpsi) | 20 | 26 | 20 |
| B/S at 1200° C. | 26 | 28 | |
| Steam Ox. | | | |
| (Δ wt %) | +4.9 | +0.1[b] | +5.0[b] |
| (Δ vol %) | +0.6 | +0.5[b] | +5.0[b] |

[a] also includes O'-sialon which may be present
[b] after refiring

It is not the intend to limit the invention to the Examples and preferred embodiments set forth hereinabove; rather, the scope of the invention is limited only by the following claims:

What is claimed is:

1. A reaction-bonded refractory article comprising at least about 60 wt % of a silicon carbide aggregate phase and a bond phase wherein (1) said aggregate phase includes a plurality of silicon carbide powders, none greater than about 200 micrometers in particle size; and (2) said bond phase includes predominantly β'-sialon and between about 5 wt % and about 30 wt % silicon nitride.

2. The refractory article of claim 1 wherein said bond phase further includes up to about 40 wt % silicon oxynitride and O'-sialon combined.

3. The refractory article of claim 1 which exhibits 4-point bending strength at room temperature of at least about 10 Kpsi.

4. The refractory article of claim 3 which exhibits 4-point bending strength at room temperature of at least about 20 Kpsi.

5. The refractory article of claim 1 which exhibits density of at least about 2.7 g/cm$^3$.

6. The refractory article of claim 5 which exhibits density of at least about 2.8 g/cm$^3$.

7. The refractory article of claim 1 which exhibits porosity of no more than about 13 vol %.

8. A refractory article of claim 7 which exhibits porosity of less than 1 vol %.

9. A refractory article of claim 1 which exhibits a weight gain of less than 1 percent when tested for oxidation resistance according to ASTM C 863-77 for 200 hours at 1100° C.

10. A fine-grained, reaction-bonded refractory article comprising at least about 60 wt % of a silicon carbide aggregate phase which includes a plurality of silicon carbide powders, none greater than about 200 micrometers in particle size, and a bond phase which includes predominantly β'-sialon, between about 5 wt % and about 30 wt % silicon nitride, and up to about 40 wt % silicon oxynitride and O'-sialon combined, said refractory article exhibiting a 4-point bending strength at both room temperature and 1200° C. of at least about 25 Kpsi, a density of at least about 2.8 g/cm$^3$, a porosity of less than 1 vol %, and a weight gain of less than 1 percent when tested for oxidation resistance according to ASTM C 863-77 for 200 hours at 1100° C.

11. A predominantly β'-sialon-bonded silicon carbide refractory article produced by a process which comprises (A) preparing a raw batch adapted for slip casting which includes in admixture (1) about 60 to about 90 wt % of a plurality of silicon carbide powders, none greater than about 200 micrometers in particle size;

(2) up to about 5 wt % silica;
(3) about 8 to about 25 wt % silicon powder;
(4) about 1.5 to about 5.5 wt % aluminum as the free metal or the metal in aluminum compounds selected from the group consisting of aluminum nitride, alumina, aluminum hydroxide, and aluminum salts combined; and
(5) about 2 to about 17 wt % vehicle;

(B) slip-casting said raw batch, yielding a green body;
(C) firing said green body under a nitrogenous atmosphere in the range of about 1300° to about 1600° C.; and
(D) recovering said reaction-bonded refractory article.

12. A refractory article of claim 11 wherein, following step (D), the recovered refractory article is refired in air and the refired article exhibits a porosity of less than 1 vol %.

13. A process for producing a reaction-bonded refractory article comprising a silicon carbide aggregate phase and a predominantly β'-sialon bond phase, which process comprises (A) preparing a raw batch which includes in admixture
(1) about 60 wt % to about 90 wt % of a plurality of silicon carbide powders, none greater than about 200 micrometers in particle size;
(2) up to about 5 wt % silica;
(3) about 8 to about 25 wt % silicon powder;
(4) about 1.5 to about 5.5 wt % aluminum as the free metal or the metal in aluminum compounds selected from the group consisting of aluminum nitride, alumina, aluminum hydroxide, and aluminum salts combined; and
(5) about 2 to about 17 wt % vehicle;

(B) processing said raw batch, yielding a green body;
(C) firing said green body under a nitrogenous atmosphere in the range of about 1300° to 1600° C.; and
(D) recovering said reaction-bonded refractory article.

14. The process of claim 13 which further comprising refiring the fired green body in air at about 1400° C. prior to recovering said reaction-bonded refractory article.

15. The process of claim 13 wherein the raw batch includes about 12 wt % to about 17 wt % aqueous vehicle and the raw batch is processed by slip-casting, yielding a green body.

16. The process of claim 13 wherein the raw batch vehicle consists essentially of about 2 wt % to about 12 wt % of a temporary binder and lubricant and the raw batch is processed by pressing a compact, yielding a green body.

* * * * *